(No Model.)
2 Sheets—Sheet 1.

H. R. ADAMS.
APPARATUS FOR OPERATING UPON THE UPPERS OF BOOTS AND SHOES.

No. 291,016.
Patented Jan. 1, 1884.

Witnesses.
Fred A. Powell
John F. C. Prinkert

Inventor.
Hiram R. Adams.
by Crosby & Gregory
atty's.

(No Model.) 2 Sheets—Sheet 2.

H. R. ADAMS.
APPARATUS FOR OPERATING UPON THE UPPERS OF BOOTS AND SHOES.

No. 291,016. Patented Jan. 1, 1884.

Witnesses.
Fred A. Powell,
John F. C. Preinhart

Inventor:
Hiram R. Adams
by Crosby & Gregory
attys

UNITED STATES PATENT OFFICE.

HIRAM R. ADAMS, OF BOSTON, MASSACHUSETTS, ASSIGNOR TO THE ADAMS MANUFACTURING COMPANY, OF PORTLAND, MAINE.

APPARATUS FOR OPERATING UPON THE UPPERS OF BOOTS AND SHOES.

SPECIFICATION forming part of Letters Patent No. 291,016, dated January 1, 1884.

Application filed May 7, 1883. (No model.)

*To all whom it may concern:*

Be it known that I, HIRAM R. ADAMS, of Boston, county of Suffolk, State of Massachusetts, have invented an Improvement in Apparatus for Operating upon the Uppers of Boots and Shoes, of which the following description, in connection with the accompanying drawings, is a specification, like letters on the drawings representing like parts.

This invention has for its object the production of an apparatus to rub against and fit the upper of a boot or shoe to a last or form on which the said upper is held stretched, and is applicable in crimping, lasting, and treeing.

In my invention as herein embodied I employ two rubbing-wheels located, when in use, each at opposite sides of the last or form, and rotated in opposite directions, the axes of the said rubbing-rollers being held or carried by arms made movable with relation to each other under the control of the operator, whereby he is enabled to keep the said rollers in contact with the upper, notwithstanding variation in the shape of the form, and to cause the said rollers to act upon the upper with more or less friction or stress, according to the material being operated upon and the extent to which it is desired to stretch the same, making the said material conform closely without wrinkles to the shape of the form, the stretching and fitting being from the center line of the top of the form toward the edges of the upper.

My invention consists, essentially, in an organized machine for stretching, fitting, and shaping an upper to a form, it containing two rubbing-rollers and means to rotate them simultaneously in opposite directions at opposite sides of the form, whereby the upper is acted upon at opposite sides of a central line drawn longitudinally through the foot of the form, and by a force exerted from the said central line toward the edges of the upper.

Figure 1:
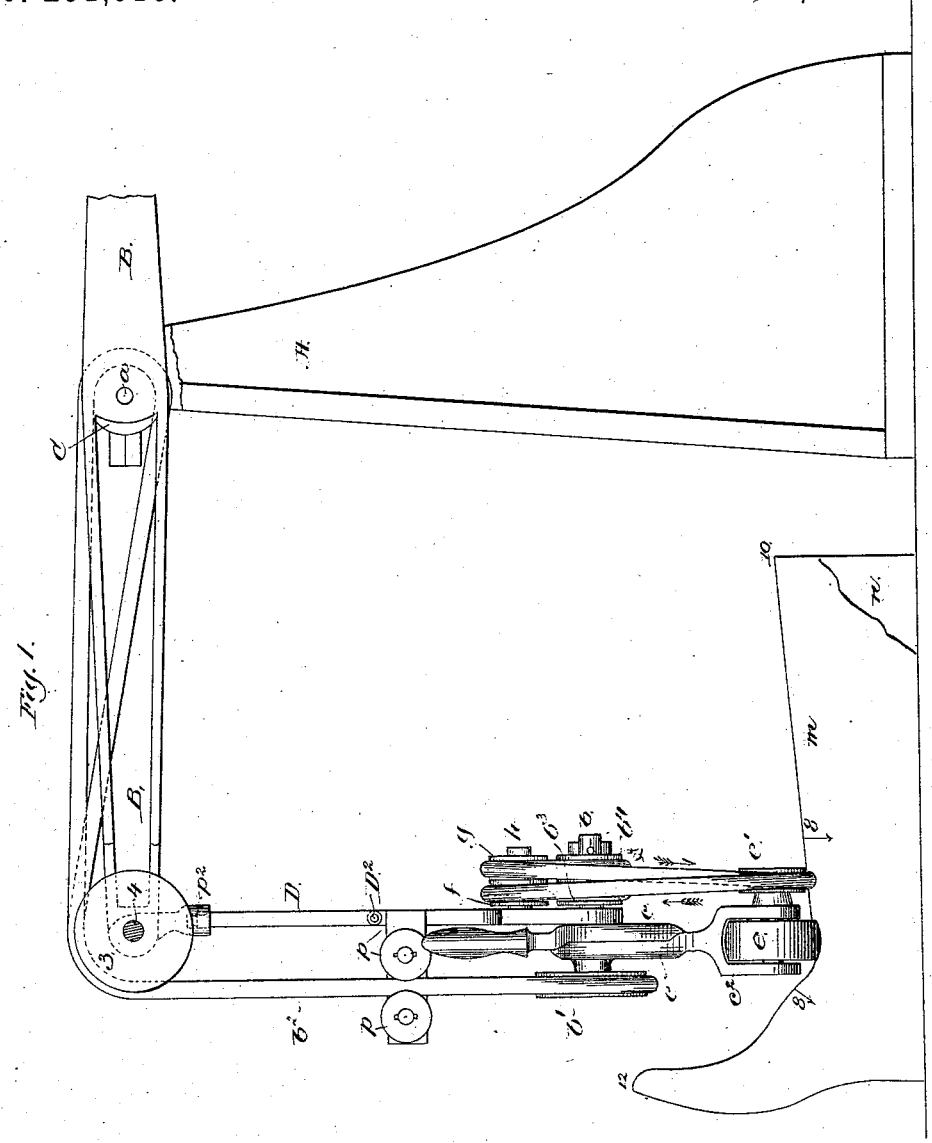
Figure 2:
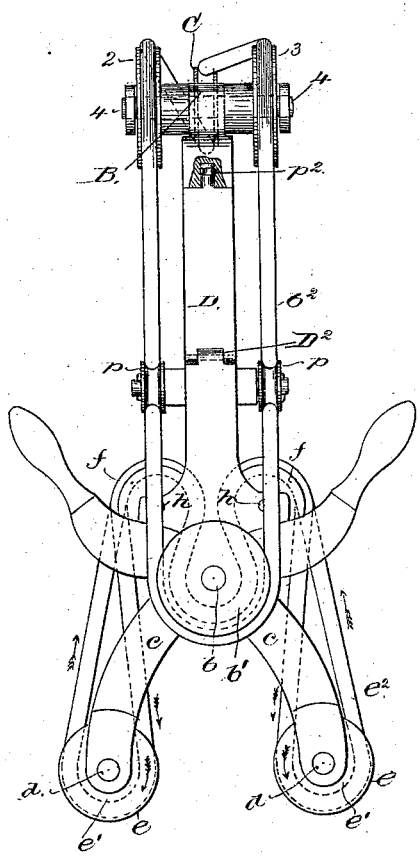
Figure 3:
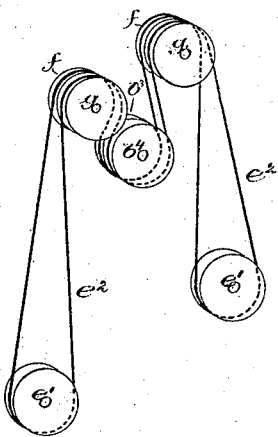

Figure 1, in side elevation, illustrates an apparatus embodying my invention. Fig. 2 is a front view of the main part of Fig. 1, and Fig. 3 is a diagram of the belts for moving the rubbing-wheels.

The standard A at its upper end supports a weighted or counterbalanced lever, B, having at its pivotal point a driving-pulley, C, and to the front end of the lever is pivoted the pendant D, which supports the rubbing devices to be described. The pendant D, pivoted at 4 on the lever B, has a short shaft, $b$, to which at one end is attached a belt-pulley, $b'$, about which is passed the main driving-belt $b^2$, extended over the two sheaves 2 3, and about the main driving-pulley C. The shaft $b$ has attached to it, at the opposite side of the pendant D, a second belt-pulley, $b^3$, and an idle-pulley, $b^4$, placed loosely on the said shaft at the side of the fast pulley $b^3$. This shaft $b$ also serves as the fulcrum for the two hand or bearing levers or arms $c\ c$, each, as herein shown, at its lowest end being provided with a handle, and with a forked part, $c^2$, and with a shaft, $d$. Each shaft $d$ has attached to it a rubbing-wheel, $e$, and a belt-pulley, $e'$, which receives an endless belt, $e^2$, extended about the two pulleys $e'$ on the shafts $d$, and also about the two idlers $f\ f$ and $g\ g$, one idler $f$ and one $g$ being placed loosely side by side on studs $h$, attached to ears of the pendant. The belt $e^4$ is also passed under and about the fast pulley $b^3$ and the sheave $b^4$, before described, the belt $e^2$ deriving its motion from the pulley $b^3$, and turning the shafts $d$ and rubbing-wheels $e$ in opposite directions to each other, as indicated by the arrows thereon, so that the said rubbing-wheels act on the upper $m$ on the form $n$ in the direction of the arrows 8, Fig. 1, or from a line drawn through the center of the upper toward its edge, or in a line toward its edge from any point of the line included between 10 and 12. The pendant D has a joint at $D^2$, to permit the lower portion of the same, which carries the shaft $b$ and parts below it, to be turned or swung up about the said hinge, to enable the rubbers to follow the curved line of the foot, the lever B, a forked lever of usual construction, being at the same time turned about its pivot $a$. Idlers or belt-tighteners $p$ act at each side the belt $b^2$, to hold it on the pulley $b'$ when the lower part of the pendant is turned on the hinge. The pendant has a joint at $p^2$, by which the lower part of D and its attached shaft $b$ may be turned about a vertical pivot or axis.

The rubbing-wheels may be made to act more or less powerfully upon the upper by turning the levers $c\ c$, and applying to them more or less force, and the said rollers may have either plain or corrugated surfaces, and be more or less hard; or, instead of the rollers, I may use brushes. Preferably the studs $h$, holding the sheaves $f\,g$, will be made adjustable to enable the belt $e^2$ to be kept taut.

I claim—

1. In a machine to act upon an upper on a form or holder, two rotating rubbers adapted to bear against the upper at opposite sides of the form or holder, and having rotary movement simultaneously in opposite directions, whereby the upper is simultaneously rubbed at both sides from its center line outward toward its edges, substantially as described.

2. The two simultaneously-rotatable rubbers and levers to sustain their shafts and regulate the pressure of the rubber against the article to be rubbed, combined with a movable pendant, and with means, substantially as described, to rotate the said rubbers.

3. The pendant and its driven shaft $b$, combined with the two shafts $d\,d$, the two pulleys $e'$, the pulley $b^3$, idler $b^4$, and the two idle pulleys or sheaves $f\,f\,g\,g$, combined with the endless belt $e^2$, arranged as described, to simultaneously turn the two shafts $d$ and their attached rubbers in opposite directions, substantially as described.

In testimony whereof I have signed my name to this specification in the presence of two subscribing witnesses.

HIRAM R. ADAMS.

Witnesses:
 G. W. GREGORY,
 BERNICE J. NOYES.